United States Patent

Infiesto et al.

[11] Patent Number: 5,808,661
[45] Date of Patent: Sep. 15, 1998

[54] AIRCRAFT AUDIO/VIDEO INTERCOM SYSTEM

[75] Inventors: Doulgas C. Infiesto, Chino Hills; Richard E. Sklar, Huntington Beach, both of Calif.

[73] Assignee: Rockwell International Corporation, Costa Mesa, Calif.

[21] Appl. No.: 780,558

[22] Filed: Jan. 8, 1997

[51] Int. Cl.[6] .............................. H04N 7/14; H04M 11/00
[52] U.S. Cl. .......................................... 348/14; 379/90.01
[58] Field of Search ..................................... 348/14–20, 8, 348/12, 552; 379/90.01, 93.01, 93.05–93.08, 93.12, 93.14, 93.37, 110.01

[56] References Cited

U.S. PATENT DOCUMENTS 4,897,714  1/1990  Ichise et al. .............................. 348/12
5,311,302  5/1994  Berry et al. .............................. 348/14

*Primary Examiner*—Wing F. Chan

[57] ABSTRACT

An intercom system that allows a flight attendant and passengers to communicate to each other to order and fill service requests, and allows the passengers to view the flight attendant at the same time by way of a display located at the passenger's seat. The flight attendant receives passenger service requests and communicates by way of a flight attendant control unit and handset that is typically located in a service galley. Passengers communicate by way of passenger control unit and handsets located at each seat. A camera mounted in the galley allows passengers to view the flight attendant while making the service request. Using the aircraft audio and video intercom system saves a flight attendant extra trips to seats to receive each service request. Using the present invention, the flight attendant can receive the request in the galley and immediately deliver the item to the passenger, thus providing faster service and response time and eliminating unnecessary trips.

7 Claims, 1 Drawing Sheet

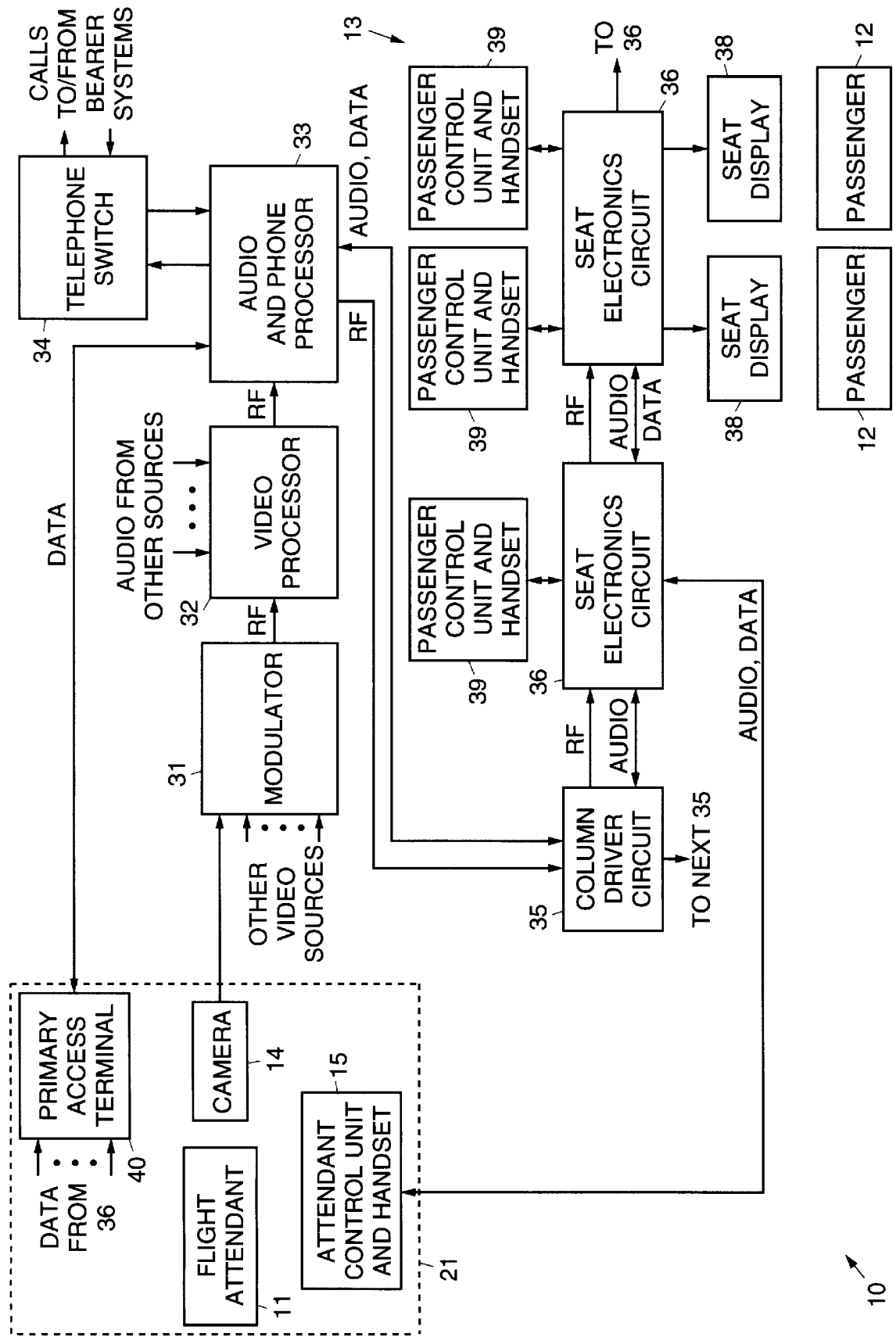

AIRCRAFT AUDIO/VIDEO INTERCOM SYSTEM

BACKGROUND

The present invention relates generally to passenger service systems used in aircraft, and more particularly, to an aircraft audio and video intercom system for use in serving passengers of an aircraft.

Current in-flight aircraft passenger service systems operate such that a passenger presses a service call button at his or her seat to call a flight attendant, and a chime or light is activated in the galley of the aircraft to alert the flight attendant. Typically conventional systems sound a chime in the galley when a passenger requires a service. The flight attendant must then go to the passenger's seat to receive the request from the passenger. The flight attendant then returns to the galley to get the desired item and then delivers it to the passenger to fill the request. Consequently, the flight attendant must make two trips to the passenger's seat fill a request, one to receive the request and the second to fill it.

The assignee of the present invention designs and manufactures aircraft entertainment systems. The inventors have determined that several of the aircraft entertainment systems may be modified to permit audio communication between a flight attendant and passengers along with providing a video image of the flight attendant to the passengers when placing service requests.

Accordingly, it is an objective of the present invention to provide for an aircraft audio and video intercom system for use in serving passengers of an aircraft.

SUMMARY OF THE INVENTION

To meet the above and other objectives, the present invention provides for an aircraft audio and video intercom system that allows flight attendants and airline passengers to communicate to each other over an aircraft telephone system, and allows the passenger to view the flight attendant at the same time by way of a display located at the passenger's seat. The flight attendant receives passenger service requests and communicates by way of a flight attendant control unit and handset in the service galley. Passengers communicate by way of passenger control unit and handsets located at each seat. A camera mounted in the galley allows passengers to view the flight attendant while making the service request.

The aircraft audio and video intercom system saves a flight attendant one trip to a seat to receive each service request. Using the present aircraft audio and video intercom system, the flight attendant can receive the request in the galley and immediately deliver the item to the passenger. This feature benefits the passenger in providing faster service and response time and the flight attendant reduces necessary time in going to seats to receive service requests.

The aircraft video intercom system may be implemented using any in-flight distributed audio and video system that supports seat-to-seat telephone communications. The aircraft audio and video intercom system may also be used in any travel environment that also delivers in-seat passenger services.

BRIEF DESCRIPTION OF THE DRAWINGS

The various features and advantages of the present invention may be more readily understood with reference to the following detailed description taken in conjunction with the accompanying drawing which illustrates an aircraft audio and video intercom system in accordance with the principles of the present invention for use on an aircraft.

DETAILED DESCRIPTION

Referring to the drawing FIGURE, it illustrates one implementation of an audio and video intercom system 10 in accordance with the principles of the present invention for use in an aircraft 20. In the embodiment shown in the drawing FIGURE, the aircraft audio and video intercom system 10 is implemented using components of an APAX-150 distributed audio and video system 30 manufactured by Hughes-Avicom International. However, it is to be understood that other aircraft audio and video distribution systems may also be adapted to implement the principles of the present invention.

The aircraft audio and video intercom system 10 permits audible and visual communication between a flight attendant 11 located in a galley 21 of the aircraft 20, and passengers 12 located at seats 13 of the aircraft 20. A camera 14 and an attendant control unit and handset 15 are disposed in the galley 21 in an appropriate location for the flight attendant 11 to utilize them. A primary access terminal 40 is also provided that is used to configure the distributed audio and video system 30 so that video images from the camera 14 are routed to the appropriate seat 13.

In the embodiment shown in the drawing FIGURE, the camera 14 and handset 15 are interfaced to components of the distributed audio and video system 30. The camera 14 is coupled to a modulator 31 that modulates the video output signals from the camera 14 along with video output signals of other sources, such as laser disks or video tape decks, for example. The modulator 31 produces modulated RF video signals containing signals from each of the sources. The modulated video RF signals are modulated at a frequency in the 50 MHz range.

The modulated video RF signals are coupled to a video processor 32. Audio signals from other sources, such as compact disks and audio tape decks, and the like, are also coupled to the video processor 32. The video processor 32 combines the modulated video RF signals with the audio signals from the other sources and outputs combined modulated RF signals. A description of the video processor 32 may be found in U.S. Pat. No. 5,289,272 entitled "Combined Data, Audio and Video Distribution System in Passenger Aircraft", which is assigned to the assignee of the present invention. The contents of U.S. Pat. No. 5,289,272 are incorporated herein by reference in its entirety. The video processor 32 is employed in the APAX-150 distributed audio and video system 30 previously developed by the assignee of the present invention.

The output of the video processor 32 is coupled to an audio and telephone processor 33, which has substantially the same architecture as the video processor 32, but which contains different operating software, and which processes video, audio and telephone signals. A telephone switch 34 is coupled to the audio and telephone processor 33 and is used to process telephone calls to and from external sources (which is not part of the present invention), although passenger control unit and handsets 39 located at each seat 13 that are used in the present invention are also used to place personal telephone calls from the aircraft. The telephone switch 34 is used to route telephone calls between various bearer system (e.g., satellite or radio links) and the passenger control unit and handsets 39 operated by the passengers 12.

The audio and telephone processor 33 is coupled to a driver circuit 35 for each column of seats. The driver circuit 35 couples the video and audio signals to each of the seat electronics circuits 36 in each column it controls. The audio processor 32 provides an interface between the telephone switch 34 and the driver circuit 35, and routes the combined modulated RF signals to the column driver circuit 35.

One seat electronics circuit 36 is located at each passenger's seat 13 and is coupled to a seat display unit 38 and to a passenger control unit and handset 39. The passenger control unit and handset 39 is substantially the same as the attendant control unit and handset 15. The seat electronics circuits 36 may be used to control one or more seat display 38 and passenger control unit and handsets 39. The passenger uses the passenger control unit and handset 39 to initiate a service call to the flight attendant 11 and to communicate with the flight attendant 11. The seat display 38 is used by the passenger to view the flight attendant 11 when making the service request. The seat display 38 is also used by the passenger to view video movies or television programming as part of the normal operation of the distributed audio and video system 30.

The plurality of seat electronics circuits 36 in a column of seats are controlled by a single driver circuit 35. The seat electronics circuits 36 couple video and audio signals from the various video and audio sources (satellite TV programming, laser disk, video tape) to each seat display 38 in the respective column. The video signals are displayed on the seat display 38 and the audio signals from the satellite TV programming, laser disk, video tape, compact disk or audio tape are output by way of a speaker of the passenger control unit and handset 39, for example.

The primary access terminal 40 is coupled to the audio and telephone processor 33 and is used to program routing of audio, video and telephone signals to and from the respective passenger seats 13. The primary access terminal 40 configures each of the seat electronics circuits 36 located at each passenger's seat 13 to permit display of pay per view programs, placing of telephone calls, and access to other communication or entertainment services. For the purposes of the present invention, the primary access terminal 40 is used to preprogram a predetermined video channel that is used to couple the video signals from the camera 14 to each of the seat electronics circuits 36 located at the seat 13. The primary access terminal 40 may also be used to preprogram the predetermined video channel for use by selected passengers that pay for the audio and video intercom services provided by the present invention. The programming of the video channel and the seat electronics circuits 36 is done by aircraft personnel for other services, and is easily done to implement the present invention.

Each of the seat electronics circuits 36 is coupled to the primary access terminal 40 so that the primary access terminal 40 can configure the seat electronics circuits 36 and the passenger control unit and handsets 39. The primary access terminal 40 controls the audio and telephone processor 33 so that the video output signals from the camera 14 are routed to that seat electronics circuit 36 for display to the passenger 13 on his or her seat display 38. The seat electronics circuit 36 also outputs audio and data to the attendant control unit and handset 15 in the galley 21.

In using the aircraft audio and video intercom system 10, a passenger 12 requiring service presses a flight attendant call button located at his or her passenger control unit and handsets 39. A chime or other alert is activated in the attendant control unit and handset 15 in the service galley 21. This signal also switches the video channel that is viewed on the seat display 38 to the preselected channel so that video signals from the camera 14 are routed to the seat display of the person making the service call. The flight attendant 11 calls the passenger 12 making the request and optionally turns on the galley camera 14. The aircraft audio and video intercom system 10 then sounds a chime at the passenger's seat by way of a speaker in the passenger control unit and handset 39. The passenger 12 makes the service request by talking on the passenger control unit and handset 39. The flight attendant 11 then provides the requested service to the passenger 12.

The aircraft audio and video intercom system 10 saves the flight attendant 11 one trip to and from a passenger's seat 13 to receive a service request. Using the aircraft audio and video intercom system 10, the flight attendant 11 can receive the request in the galley 21 and deliver a requested item or provide the service to the passenger 12 without making an extra trip. This feature benefits the passenger 12 by providing faster service and response time, and the flight attendant 11 eliminates trips to seats to receive service requests.

While the above description discusses a reduced to practice embodiment of the present invention, it is to be understood that other embodiments of the present system 10 may be designed. For example, a very basic system 10 would include the attendant control unit and handset 15, the passenger control unit and handsets 39 and seat electronic units 36 or other seat interface circuits 36, a video camera 14 and a dedicated programmable video channel between the camera 14 and each of the seat electronic units 36 and/or seat displays 38. Thus, the modulator 31, video processor 32 audio and telephone processor 33, and the column driver circuit 35 may be viewed as a video channel coupled between the camera 14 and each of the seat electronic units 36 and/or seat displays 38.

Thus, an aircraft audio and video intercom system for use in serving passengers of an aircraft has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An aircraft audio and video intercom system comprising:
   a camera for generating video images of a flight attendant;
   a flight attendant control unit and handset;
   a plurality of passenger control unit and handsets;
   a plurality of seat interface circuits for coupling audio signals and data between the flight attendant control unit and handset and the plurality of passenger control unit and handsets;
   a plurality of seat displays coupled to the plurality of seat interface circuits for displaying the video images of a flight attendant produced by the camera; and
   a programmable video channel coupled between the camera and each of the seat interface circuits for selectively coupling the video images of the flight attendant from the camera to the plurality of seat displays.

2. The system of claim 1 wherein the video channel comprises a distributed audio and video system including:
   a modulator coupled to the camera for modulating the video output signals therefrom;
   processor means coupled to the modulator for processing the modulated video output signals, audio signals, and telephone signals;

a plurality of seat column driver circuits coupled between the audio and telephone processor and the plurality of seat interface circuits 36 in a row of seats;

a primary access terminal coupled to the processor means and to the seat electronics circuits for configuring them so that the modulated video output signals from the camera are routed to predetermined seat displays; and a driver circuit for each column of seats coupled between the processor means and the seat electronics circuits in each column of seats for coupling the modulated video output signals to each of the seat electronics circuits in the column.

3. The system of claim 2 wherein the processor means comprises:

a video processor coupled to the modulator for combining the modulated video RF signals with the audio signals from the other sources and outputs a combined modulated RF signal; and an audio and telephone processor coupled to the video processor for routing the combined modulated RF signals to the column driver circuit.

4. The system of claim 3 wherein the distributed audio and video system further comprises:

a telephone switch coupled to the audio and telephone processor for routing telephone calls between bearer system and the passenger control unit and handsets operated by the passengers.

5. An audio and video intercom system for use in an aircraft, said system comprising:

a camera for generating video images of a flight attendant;

a flight attendant control unit and handset;

a plurality of passenger control unit and handsets;

a plurality of seat displays for displaying the video images of the flight attendant to each passenger that are derived from the camera;

a plurality of seat interface circuits respectively coupled between the flight attendant control unit and handset and the plurality of passenger control unit and handsets for coupling audio signals and data therebetween, and coupled to at least one seat display for coupling the video output signals from the camera thereto; and a distributed audio and video system comprising:

a modulator coupled to the camera for modulating the video output signals therefrom;

processor means coupled to the modulator for processing the modulated video output signals, audio signals, and telephone signals;

a plurality of seat column driver circuits respectively coupled between the audio and telephone processor and the plurality of seat interface circuits in a row of seats;

a primary access terminal coupled to the audio and telephone processor and the seat electronics circuits for configuring them so that video images from the camera are routed to appropriate seat displays;

a driver circuit for each column of seats coupled to the audio and telephone processor for coupling the video and audio signals to each of the seat electronics circuits in each column it controls.

6. The system of claim 5 wherein the processor means comprises:

a video processor coupled to the modulator for combining the modulated video RF signals with the audio signals from the other sources and outputs a combined modulated RF signal; and an audio and telephone processor coupled to the video processor for routing the combined modulated RF signals to the column driver circuit.

7. The system of claim 6 wherein the distributed audio and video system further comprises:

a telephone switch coupled to the audio and telephone processor for routing telephone calls between bearer system and the passenger control unit and handsets operated by the passengers.

\* \* \* \* \*